US006004668A

United States Patent [19]
Deaner et al.

[11] Patent Number: 6,004,668
[45] Date of Patent: Dec. 21, 1999

[54] ADVANCED POLYMER WOOD COMPOSITE

[75] Inventors: Michael J. Deaner, Osceola, Wis.; Giuseppe Puppin, Bayport; Kurt E. Heikkila, Circle Pines, both of Minn.

[73] Assignee: Andersen Corporation, Bayport, Minn.

[21] Appl. No.: 09/178,953

[22] Filed: Oct. 26, 1998

Related U.S. Application Data

[63] Continuation of application No. 08/543,959, Oct. 17, 1995, Pat. No. 5,827,607, which is a continuation of application No. 08/224,396, Apr. 7, 1994, abandoned, which is a continuation of application No. 07/938,364, Aug. 31, 1992, abandoned.

[51] Int. Cl.$^6$ ...................................................... B32B 5/16
[52] U.S. Cl. ........................... 428/326; 428/359; 428/361; 428/378; 428/393; 428/332; 428/407; 428/402; 428/507; 428/510; 428/511; 428/514; 523/222; 524/13; 524/14; 524/551
[58] Field of Search .................................. 524/13, 14, 16, 524/34, 551, 567, 908; 523/222; 428/402, 407, 507, 510, 511, 514, 573, 375, 361, 393, 326

[56] References Cited

U.S. PATENT DOCUMENTS

| | | |
|---|---|---|
| 2,188,396 | 1/1940 | Semon . |
| 2,489,373 | 11/1949 | Gilman . |
| 2,519,442 | 8/1950 | Delorme et al. . |
| 2,558,378 | 6/1951 | Petry . |
| 2,635,976 | 4/1953 | Meiler et al. . |
| 2,680,102 | 6/1954 | Becher . |
| 2,789,903 | 4/1957 | Lukman et al. . |
| 2,926,729 | 3/1960 | Zanini . |
| 2,935,763 | 5/1960 | Newman et al. . |
| 3,147,518 | 9/1964 | Horgan, Jr. . |
| 3,287,480 | 11/1966 | Wechsler et al. . |
| 3,308,218 | 3/1967 | Wiegand et al. . |
| 3,309,444 | 3/1967 | Schueler . |
| 3,349,538 | 10/1967 | Crossman . |
| 3,432,885 | 3/1969 | Zanini . |
| 3,492,388 | 1/1970 | Inglin-Knosel . |
| 3,493,527 | 2/1970 | Schueler . |
| 3,562,373 | 2/1971 | Logrippo . |
| 3,645,939 | 2/1972 | Gaylord . |
| 3,671,615 | 6/1972 | Price . |
| 3,833,325 | 9/1974 | Ramsey . |
| 3,844,091 | 10/1974 | Vedvik et al. . |
| 3,878,143 | 4/1975 | Baumann et al. . |
| 3,888,810 | 6/1975 | Shinomura . |
| 3,899,559 | 8/1975 | Johnanson et al. . |
| 3,904,726 | 9/1975 | Jacquelin et al. . |
| 3,931,384 | 1/1976 | Forquer et al. . |
| 3,943,079 | 3/1976 | Hamed . |
| 3,956,541 | 5/1976 | Pringle . |
| 3,956,555 | 5/1976 | McKean . |
| 3,969,459 | 7/1976 | Fremont et al. . |
| 4,005,162 | 1/1977 | Bucking . |
| 4,012,348 | 3/1977 | Chelland et al. . |
| 4,016,232 | 4/1977 | Pringle . |
| 4,018,722 | 4/1977 | Baker . |
| 4,033,913 | 7/1977 | Sunden . |
| 4,045,603 | 8/1977 | Smith . |
| 4,056,591 | 11/1977 | Goettler et al. . |
| 4,058,580 | 11/1977 | Flanders . |
| 4,071,479 | 1/1978 | Broyde et al. . |
| 4,097,648 | 6/1978 | Pringle . |
| 4,102,106 | 7/1978 | Golder et al. . |
| 4,115,497 | 9/1978 | Halmo . |
| 4,145,389 | 3/1979 | Smith . |
| 4,168,251 | 9/1979 | Schinzel et al. . |

(List continued on next page.)

FOREIGN PATENT DOCUMENTS

| | | |
|---|---|---|
| 2200112 | 4/1974 | France . |
| 2 270 311 | 12/1975 | France . |
| 2365019 | 9/1976 | France . |
| 2 344 101 | 10/1977 | France . |
| 2445885 | 4/1979 | France . |
| 2564374 | 11/1985 | France . |
| 2042176 | 4/1971 | Germany . |
| 2270311 | 4/1971 | Germany . |
| 24 27 080 | 11/1975 | Germany . |
| 2344101 | 1/1977 | Germany . |
| 2 036 148 | 6/1980 | United Kingdom . |
| 2104903 | 3/1983 | United Kingdom . |
| 2171953 | 9/1986 | United Kingdom . |
| 2186655 | 8/1987 | United Kingdom . |
| WO 90/08020 | 7/1990 | WIPO . |
| WO 92/07022 | 10/1991 | WIPO . |

OTHER PUBLICATIONS

"A Complete Guide to Andersen Windows & Patio Doors", 1992 Product Catalog.

"Mechanical Properties of Wood", Revisions by Bendtsen et al., pp. 4–2 through 4–44 undated.

Advanced Environmental Recycling Technologies, Inc., Recycling Solutions for the 90's AERT Moistureshield Industrial OEM Price List, Effective Jul. 15, 1991 through Oct. 15, 1991.

BFGoodrich, Geon Vinyl Division, Section One, FIBER-LOC®, *Polymer Composites*, Engineering Design Data Sheet, pp. 2–15, undated.

Dalvag et al., "The Efficiency of Cellulosic Fillers in Common Thermoplastics. Part II. Filling with Process Aids and Coupling Agents", *International Journal of Polymeric Materials*, 11:9–38 (1985).

(List continued on next page.)

*Primary Examiner*—William Krynski
*Assistant Examiner*—J. M. Gray
*Attorney, Agent, or Firm*—Merchant & Gould P.C.

[57] ABSTRACT

A composition in the form of pellets comprising a thermoplastic and wood fiber composite material suitable for forming structural members as a replacement for wood in the manufacture of doors and windows. The composite has less than about 10 wt % water based on pellet weight and a Young's modulus of at least about 500,000. Structural members are typically formed from the composite in an extrusion or an injection molding process.

39 Claims, No Drawings

U.S. PATENT DOCUMENTS

| | | |
|---|---|---|
| 4,181,764 | 1/1980 | Totten . |
| 4,187,352 | 2/1980 | Klobbie . |
| 4,202,804 | 5/1980 | Porzel et al. . |
| 4,203,876 | 5/1980 | Dereppe et al. . |
| 4,228,116 | 10/1980 | Colombo et al. . |
| 4,239,679 | 12/1980 | Rolls et al. . |
| 4,244,903 | 1/1981 | Schnause . |
| 4,248,743 | 2/1981 | Goettler . |
| 4,248,820 | 2/1981 | Haataja . |
| 4,250,222 | 2/1981 | Mavel et al. . |
| 4,263,184 | 4/1981 | Leo et al. . |
| 4,273,688 | 6/1981 | Porzel et al. . |
| 4,277,428 | 7/1981 | Luck et al. . |
| 4,281,039 | 7/1981 | Miura et al. . |
| 4,290,988 | 9/1981 | Nopper et al. . |
| 4,305,901 | 12/1981 | Prince et al. . |
| 4,311,554 | 1/1982 | Herr . |
| 4,311,621 | 1/1982 | Nishizawa et al. . |
| 4,323,625 | 4/1982 | Coran et al. . |
| 4,328,136 | 5/1982 | Blount . |
| 4,376,144 | 3/1983 | Goettler . |
| 4,382,108 | 5/1983 | Carroll et al. . |
| 4,393,020 | 7/1983 | Li et al. . |
| 4,414,267 | 11/1983 | Coran et al. . |
| 4,420,351 | 12/1983 | Lussi et al. . |
| 4,426,470 | 1/1984 | Wessling et al. . |
| 4,440,708 | 4/1984 | Haataja et al. . |
| 4,454,091 | 6/1984 | Chion et al. . |
| 4,455,709 | 6/1984 | Zanini . |
| 4,481,701 | 11/1984 | Hewitt . |
| 4,491,553 | 1/1985 | Yamada et al. . |
| 4,503,115 | 3/1985 | Hemels et al. . |
| 4,505,869 | 3/1985 | Nishibori . |
| 4,506,037 | 3/1985 | Suzuki et al. . |
| 4,508,595 | 4/1985 | Gasland . |
| 4,551,294 | 11/1985 | Wottka et al. . |
| 4,562,218 | 12/1985 | Fornadel et al. . |
| 4,594,372 | 6/1986 | Natov et al. . |
| 4,597,928 | 7/1986 | Terentiev et al. . |
| 4,610,900 | 9/1986 | Nishibori . |
| 4,619,097 | 10/1986 | Trummer et al. . |
| 4,645,631 | 2/1987 | Hagenstaller et al. . |
| 4,659,754 | 4/1987 | Edwards et al. . |
| 4,663,225 | 5/1987 | Farley et al. . |
| 4,686,251 | 8/1987 | Ostermann et al. . |
| 4,687,793 | 8/1987 | Motegi et al. . |
| 4,716,062 | 12/1987 | Klein . |
| 4,734,236 | 3/1988 | Davis . |
| 4,737,532 | 4/1988 | Fujita et al. . |
| 4,769,109 | 9/1988 | Tellvik et al. . |
| 4,769,274 | 9/1988 | Tellvik et al. . |
| 4,774,272 | 9/1988 | Lamphere et al. . |
| 4,790,966 | 12/1988 | Sandberg et al. . |
| 4,791,024 | 12/1988 | Clerici et al. . |
| 4,818,604 | 4/1989 | Tock . |
| 4,820,763 | 4/1989 | Yang . |
| 4,837,977 | 6/1989 | Mauro . |
| 4,851,458 | 7/1989 | Hopperdietzel . |
| 4,865,788 | 9/1989 | Davis . |
| 4,889,673 | 12/1989 | Takimoto . |
| 4,894,192 | 1/1990 | Warych . |
| 4,915,764 | 4/1990 | Miani . |
| 4,927,579 | 5/1990 | Moore . |
| 4,929,409 | 5/1990 | Agren et al. . |
| 4,935,182 | 6/1990 | Ehner et al. . |
| 4,957,809 | 9/1990 | Davis . |
| 4,960,548 | 10/1990 | Ideda et al. . |
| 4,968,463 | 11/1990 | Levasseur . |
| 4,973,440 | 11/1990 | Tamura et al. . |
| 4,978,489 | 12/1990 | Radvan et al. . |
| 4,978,575 | 12/1990 | Ziess . |
| 4,988,478 | 1/1991 | Held . |
| 5,002,713 | 3/1991 | Palardy et al. . |
| 5,008,310 | 4/1991 | Beshay . |
| 5,009,586 | 4/1991 | Pallmann . |
| 5,020,915 | 6/1991 | Julien . |
| 5,021,490 | 6/1991 | Vyvoda et al. . |
| 5,028,266 | 7/1991 | Rettenmaier . |
| 5,049,334 | 9/1991 | Bach . |
| 5,057,167 | 10/1991 | Gersbeck . |
| 5,075,057 | 12/1991 | Hoedl . |
| 5,075,359 | 12/1991 | Castagna et al. . |
| 5,078,937 | 1/1992 | Eela . |
| 5,082,605 | 1/1992 | Brooks et al. . |
| 5,084,135 | 1/1992 | Brooks et al. . |
| 5,087,400 | 2/1992 | Theuveny . |
| 5,088,910 | 2/1992 | Goforth et al. . |
| 5,093,058 | 3/1992 | Harmon et al. . |
| 5,096,046 | 3/1992 | Goforth et al. . |
| 5,096,406 | 3/1992 | Brooks et al. . |
| 5,100,545 | 3/1992 | Brooks . |
| 5,120,776 | 6/1992 | Raj et al. . |
| 5,183,837 | 2/1993 | Lepori et al. . |
| 5,441,801 | 8/1995 | Deaner et al. .......................... 428/378 |
| 5,486,553 | 1/1996 | Deaner et al. . |
| 5,539,027 | 7/1996 | Deaner et al. . |

OTHER PUBLICATIONS

Database WPI, Week 8402, Derwent Publications Ltd., London, GB; AN 84–008707 & JP–A–58 204 049 (Ein Eng.) (Nov. 28, 1983).

Database WPI, Week 8442, Derwent Publications Ltd., London, GB; AN 84–259377 & JP–A–59 156 172 (Ain Eng.) (Sep. 6, 1984).

Database WPI, Week 84721, Derwent Publications Ltd., London, GB, AN 87–147663 & JP–A–61 086 042 (Chisso), (Apr. 20, 1987).

Database WPI, Week 8652, Derwent Publications Ltd., London, GB; AN 86–341745 & JP–A–61 236 858 (Chisso) (Oct. 22, 1986).

Klason et al., "The Efficiency of Cellulosic Fillers in Common Thermoplastics. Part I. Filling Without Processing Aids or Coupling Agents", *International Journal of Polymeric Materials*, pp. 159–187 (Mar. 1984).

Kokta et al., "Composites of Poly(Vinyl Chloride) and Wood Fibers. Part II: Effect of Chemical Treatment", *Polymer Composites*, 11(2):84–89 (Apr. 1990).

Kokta et al., "Composites of Polyvinyl Chloride–Wood Fibers. I. Effect of Isocyanate as a Bonding Agent", *Polym. Plast. Technol. Eng.*, 29(1&2):87–118 (1990).

Kokta et al., "Composites of Polyvinyl Chloride–Wood Fibers. III. Effect of Silane as Coupling Agent", *Journal of Vinyl Technology*, 12(3):146–153 (Sep. 1990).

Kokta et al., "Use of Grafted Wood Febers in Thermoplastic Composites V. Polystyrene", pp. 90–96, undated.

Kokta et al., "Use of Wood Fibers in Thermoplastic Composites", *Polymer Composites*, 4(4):229–232 (Oct. 1983).

Maldas et al., "Composites of Polyvinyl Chloride–Wood Fibers: IV. Effect of the Nature of Fibers", *Journal of Vinyl Technology*, 11(2):90–98 (Jun. 1989).

Raj et al., "Use of Wood Fibers as Filler in Common Thermoplastic Studies on Mechanical Properties", *Science and Engineering of Composite Materials*, 1(3):85–98 (1989).

Raj et al., "Use of Wood Fibers in Thermoplastics. VII. The Effect of Coupling Agents in Polyethylene–Wood Fiber Composites", *Journal of Applied Polymer Science*, 37:1089–1103 (1989).

Rogalski et al., "Poly(Vinyl–Chloride) Wood Fiber Composites", Antec '87, pp. 1436–1441.

Sean et al., "A Study of the Mechanical Properties of Wood Fiber to Polystyrene Composites", *Drevarsky Vyskum*, Zvazuk, 133 (1992).

The Geon Company Product Literature (1994).

Woodhams et al., "Wood Fibers as Reinforcing Fillers for Polyolefins", *Polymer Engineering and Science*, 24(15):1166–1171 (Oct. 1984).

Yam et al., "Composites From Compounding Wood Fibers With Recycled High Density Polyethylene", *Polymer Engineering and Science*, 30(11):693–699 (Jun. 1990).

Zadorecki et al., "Future Prospects for Wood Cellulose as Reinforcement in Organic Polymer Composites", *Polymer Composites*, 10(2):69–77 (Apr. 1989).

"Träfylld plast enligt ny metod" ("Wood–Filled Plastic By a New Method"), *Skogen* 13:74 (date unknown) (translated).

"Byggkatalogen Svensk Byggkatalog 91/92 (Swedish Builders Catalog, 91/92)," 6 pages, with 1–page English translation.

Primo Sverige AB brochure, "Sonwood® Interior Profiles," 8 pgs (1993).

Holl, M., "Organische Verststärkungsfasern für Kunststoffe (Organic Reinforcement Fibres for Plastics)", *Kunstoff German Plastics,* vol. 80 (1990); 3 pages, with 4 pages of English translation.

Möller GmbH & Co. KG brochure: "Möller Lignodur Innenfensterbänke—Grosshandels–Preisliste", 7 pages (date unknown).

ADVANCED POLYMER WOOD COMPOSITE

This application is a continuation of U.S. Ser. No. 08/543,959 filed Oct. 17, 1995, now U.S. Pat. No. 5,827,607; which is a continuation of U.S. Ser. No. 08/224,396 filed Apr. 7, 1994, now abandoned; which is a continuation of U.S. Ser. No. 07/938,364 filed Aug. 31, 1992, now abandoned.

FIELD OF THE INVENTION

This invention relates to composite thermoplastic materials used for the fabrication of structural members. Such members an be any structural unit, preferably they are for use in windows and doors for residential and commercial architecture. These composite materials include an optional, intentional recycle of by-product streams, from window and door manufacture, of polymer, adhesive, paint, etc. More particularly, the invention relates to an improved composite material adapted to extrusion or injection-molding processes for forming structural members that have improved properties when used in windows and doors. The composite materials of the invention can be made to manufacture structural components such as rails, jambs, stiles, sills, tracks, stop and sash, nonstructural trim elements such as grid, cove, bead, quarter round, etc.

BACKGROUND OF THE INVENTION

Conventional window and door manufacture has commonly used wood and metal components in forming structural members. Commonly, residential windows are manufactured from milled wood products that are assembled with glass to form typically double hung or casement units. Wood windows while structurally sound, useful and well adapted for use in many residential installations, can deteriorate under certain circumstances. Wood windows also require painting and other periodic maintenance. Wooden windows also suffer from cost problems related to the availability of suitable wood for construction. Clear wood products are slowly becoming more scarce and are becoming more expensive as demand increases. Metal components are often combined with glass and formed into single unit sliding windows. Metal windows typically suffer from substantial energy loss during winter months.

Extruded thermoplastic materials have been used in window and door manufacture. Filled and unfilled thermoplastics have been extruded into useful seals, trim, weatherstripping, coatings and other window construction components. Thermoplastic materials such as polyvinyl chloride have been combined with wood members in manufacturing PERMASHIELD® brand windows manufactured by Andersen Corporation for many years. The technology disclosed in Zanini, U.S. Pat. Nos. 2,926,729 and 3,432,883, have been utilized in the manufacturing of plastic coatings or envelopes on wooden or other structural members. Generally, the cladding or coating technology used in making PERMASHIELD® windows involves extruding a thin polyvinyl chloride coating or envelope surrounding a wooden structural member.

Polyvinyl chloride has been combined with wood to make extruded materials. However, such materials have not successfully been used in the form of a structural member that is a direct replacement for wood. Common thermoplastic composite materials cannot provide similar thermal and structural properties to wood. These extruded materials fail to have sufficient modulus, compressive strength, coefficient of thermal expansion that matches wood to produce a direct replacement material. Further, many prior art extruded composites must be milled after extrusion to a final useful shape. Typical commodity plastics have achieved a modulus no greater than about 500,000. One class of composite, a polyvinyl chloride/wood flour material, poses the added problem that wood dust, which can accumulate during manufacture, tends to be explosive at certain concentrations of wood flour in the air. Most commonly, poly vinyl chloride, polystyrene and polyethylene thermoplastics have been used in such products.

Accordingly, a substantial need exists for a composite material that can be made of polymer and wood fiber with an optional, intentional recycle of a waste stream. A further need exists for a composite material that can be extruded into a shape that is a direct substitute for the equivalent milled shape in a wooden or metal structural member. This need requires a coefficient of thermal expansion that approximates wood, a material that can be extruded into reproducible stable dimensions, a high compressive strength, a low thermal transmission rate, an improved resistance to insect attack and rot while in use and a hardness and rigidity that permits sawing, milling, and fastening retention comparable to wood members. Further, companies manufacturing window and door products have become significantly sensitive to waste streams produced in the manufacture of such products. Substantial quantities of wood waste including wood trim pieces, sawdust, wood milling by-products; recycled thermoplastic including recycled polyvinyl chloride, has caused significant expense to window manufacturers. Commonly, these materials are either burned for their heat value in electrical generation or are shipped to qualified landfills for disposal. Such waste streams are contaminated with substantial proportions of hot melt and solvent-based adhesives, waste thermoplastic such as polyvinyl chloride, paint, preservatives, and other organic materials. A substantial need exists to find a productive environmentally compatible use for such waste streams to avoid returning the materials into the environment in an environmentally harmful way.

BRIEF DISCUSSION OF THE INVENTION

We have found that the problems relating to forming a substitute for wood and metal structural members and the problems relating to the recycle of waste streams in window manufacture can be solved by forming a polymer/wood fiber composite material into window and door structural members. The polyvinyl chloride can be combined with wood fiber and waste materials to form a polyvinyl chloride/wood fiber composite, preferably in the form of a pellet. The wood fiber comprises the sawdust or milling byproduct waste stream from milling wooden members in window manufacture and can be contaminated with substantial proportions of hot melt adhesive, paint, solvent or adhesive components, preservatives, polyvinyl chloride recycle pigment, plasticizers, etc. We have found that the PVC and wood fiber composite can be manufactured into acceptable substitutes for wooden members if the PVC and wood material contains less than about 10 wt-%, preferably less than 3.5% water based on pellet weight. The compositions can achieve in a final product high modulus, high compressive strength, reproducible, stable dimensions and a superior modulus of elasticity. We have also found that the successful manufacture of structural members for windows and doors requires the preliminary manufacture of the polyvinyl chloride wood fiber composite in the form of a pellet wherein the materials are intimately mixed and contacted in forming the pellet prior to the extrusion of the members from the pellet material. We have found that the intimate mixing of the polyvinyl chloride, wood fiber, and waste in the manufacture of the pellet process with associated control of moisture content produces a pelletized product that is uniquely adapted to the extrusion manufacture of PVC/wood fiber components and achieves the manufacture of a useful wood replacement product.

DETAILED DESCRIPTION OF THE INVENTION

The invention relates to the use of polyvinyl chloride and wood fiber composite materials with a controlled water content in the form of a pelletized material wherein the wood fiber is intimately contacted and wetted by the organic materials. The intimate contact and wetting between the components in the pelletizing process ensures high quality physical properties in the extruded composite materials after manufacture.

Pellet

The polyvinyl chloride and wood fiber can be combined and formed into a pellet using a thermoplastic extrusion processes. Wood fiber can be introduced into pellet making process in a number of sizes. We believe that the wood fiber should have a minimum size of length and width of at least 1 mm because wood flour tends to be explosive at certain wood to air ratios. Further, wood fiber of appropriate size of a aspect ratio greater than 1 tends to increase the physical properties of the extruded structural member. However, useful structural members can be made with a fiber of very large size. Fibers that are up to 3 cm in length and 0.5 cm in thickness can be used as input to the pellet or linear extrudate manufacturing process. However, particles of this size do not produce highest quality structural members or maximized structural strength. The best appearing product with maximized structural properties are manufactured within a range of particle size as set forth below. Further, large particle wood fiber an be reduced in size by grinding or other similar processes that produce a fiber similar to sawdust having the stated dimensions and aspect ratio. One further advantage of manufacturing sawdust of the desired size is that the material can be pre-dried before introduction into the pellet or linear extrudate manufacturing process. Further, the wood fiber can be pre-pelletized into pellets of wood fiber with small amounts of binder if necessary.

During the pelletizing process for the composite pellet, the polyvinyl chloride and wood fiber are intimately contacted at high temperatures and pressures to insure that the wood fiber and polymeric material are wetted, mixed and extruded in a form such that the polymer material, on a microscopic basis, coats and flows into the pores, cavity, etc., of the fibers. The fibers are preferably substantially oriented by the extrusion process in the extrusion direction. Such substantial orientation causes overlapping of adjacent parallel fibers and polymeric coating of the oriented fibers resulting a material useful for manufacture of improved structural members with improved physical properties. The degree of orientation is about 20%, preferably 30% above random orientation which is about 45 to 50%. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. Depending on the equipment used and processing conditions, control of the water content of the linear extrudate or pellet can be important in forming a successful structural member substantially free of internal voids or surface blemishes. The concentration of water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member.

Trees when cut depending on relative humidity and season can contain from 30 to 300 wt-% water based on fiber content. After rough cutting and finishing into sized lumber, seasoned wood can have a water content of from 20 to 30 wt-% based on fiber content. Kiln dried sized lumber cut to length can have a water content typically in the range of 8 to 12%, commonly 8 to 10 wt-% based on fiber. Some wood source, such as poplar or aspen, can have increased moisture content while some hard woods can have reduced water content.

Because of the variation in water content of wood fiber source and the sensitivity of extrudate to water content control of water to a level of less than about 8 wt-% in the pellet based on pellet weight is important. Structural members extruded in non-vented extrusion process, the pellet should be as dry as possible and have a water content between 0.01 and 5%, preferably less than 3.5 wt-%. When using vented equipment in manufacturing the extruded linear member, a water content of less than about 8 wt-% can be tolerated if processing conditions are such that vented extrusion equipment can dry the thermoplastic material prior to the final formation of the structural member of the extrusion head.

The pellets or linear extrudate of the invention are made by extrusion of the polyvinyl chloride and wood fiber composite through an extrusion die resulting in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section. The pellet volume is preferably greater than about 12 $mm^3$. The preferred pellet is a right circular cylinder, the preferred radius of the cylinder is at least 1.5 mm with a length of-at least 1 mm. Preferably, the pellet has a radius of about 1 to 5 mm and a length of about 1 to 10 mm. Most preferably, the cylinder has a radius of 2.3 to 2.6 mm, a length of 2.4 to 4.7 mm, a volume of 40 to 100 $mm^3$, a weight of 40 to 130 mg and a bulk density of about 0.2 to 0.8 $gm/mm^3$.

We have found that the interaction, on a microscopic level, between the polymer mass and the wood fiber is an important element of the invention. We have found that the physical properties of an extruded member are improved when the polymer melt during extrusion of the pellet or linear member thoroughly wets and penetrates the wood fiber particles. The thermoplastic material comprises an exterior continuous organic polymer phase with the wood particle dispersed as a discontinuous phase in the continuous polymer phase. The material during mixing and extrusion obtains an aspect ratio of at least 1.1 and preferably between 2 and 4, optimizes orientation such as at least 20 wt-%, preferably 30% of the fibers are oriented in an extruder direction and are thoroughly mixed and wetted by the polymer such that all exterior surfaces of the wood fiber are in contact with the polymer material. This means, that any pore, crevice, crack, passage way, indentation, etc., is fully filled by thermoplastic material. Such penetration as attained by ensuring that the viscosity of the polymer melt is reduced by operations at elevated temperature and the use of sufficient pressure to force the polymer into the available internal pores, cracks and crevices in and on the surface of the wood fiber.

During the pellet or linear extrudate manufacture, substantial work is done in providing a uniform dispersion of the wood into the polymer material. Such work produces substantial orientation which when extruded into a final structural member, permits the orientation of the fibers in the structural member to be increased in the extruder direction resulting in improved structural properties.

The pellet dimensions are selected for both convenience in manufacturing and in optimizing the final properties of the extruded materials. A pellet is with dimensions substantially less than the dimensions set forth above are difficult to extrude, pelletize and handle in storage. Pellets larger than the range recited are difficult to introduce into extrusion or injection molding equipment, and are different to melt and form into a finished structural member.

Polyvinyl Chloride Homopolymer Copolymers and Polymeric Alloys

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride resulting in a useful thermoplastic polymer. After polymerization, polyvinyl chloride is commonly combined with thermal stabilizers, lubricants, plasticizers, organic and inorganic pigments, fillers, biocides, processing aids, flame retardants and other commonly available additive materials. Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidine dichloride, acrylate momoners such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Such monomers can be used in an amount of up to about 50 mol-%, the balance being vinyl chloride. Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. Polyvinyl chloride forms a number of known polymer alloys including, for example, polyvinyl chloride/nitrile rubber; polyvinyl chloride and related chlorinated copolymers and terpolymers of polyvinyl chloride or vinylidine dichloride; polyvinyl chloride/alphamethyl styrene-acrylonitrile copolymer blends; polyvinyl chloride/polyethylene; polyvinyl chloride/chlorinated polyethylene and others.

The primary requirement for the substantially thermoplastic polymeric material is that it retain sufficient thermoplastic properties to permit melt blending with wood fiber, permit formation of linear extrudate pellets, and to permit the composition material or pellet to be extruded or injection molded in a thermoplastic process forming the rigid structural member. Polyvinyl chloride homopolymers copolymers and polymer alloys are available from a number of manufacturers including B. F. Goodrich, Vista, Air Products, Occidental Chemicals, etc. Preferred polyvinyl chloride materials are polyvinyl chloride homopolymer having a molecular weight of about 90,000±50,000, most preferably about 88,000±10,000.

Wood Fiber

Wood fiber, in terms of abundance and suitability can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly at least 3 mm in length, 1 mm in thickness and commonly have an aspect ratio of at least about 1.8. Preferably, the fibers are 1 to 10 mm in length, 0.3 to 1.5 mm in thickness with an aspect ratio between 2 and 7, preferably 2.5 to 6.0. The preferred fiber for use in this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be pre-pelletized before use in composite manufacture.

Such sawdust material can contain substantial proportions of waste stream by-products. Such by-products include waste polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other waste streams common in the manufacture of wooden doors and windows. The total waste stream content of the wood fiber materials is commonly less than 25 wt-% of the total wood fiber input into the polyvinyl chloride wood fiber product. Of the total waste recycle, approximately 10 wt-% of that can comprise a vinyl polymer commonly polyvinyl chloride. Commonly, the intentional recycle ranges from about 1 to about 25 wt-%, preferably about 2 to about 20 wt-%, most commonly from about 3 to about 15 wt-% of contaminants based on the sawdust.

Composition and Pellet Manufacture

In the manufacture of the composition and pellet of the invention, the manufacture and procedure requires two important steps. A first blending step and a second pelletizing step.

During the blending step, the polymer and wood fiber are intimately mixed by high shear mixing components with recycled material to form a polymer wood composite wherein the polymer mixture comprises a continuous organic phase and the wood fiber with the recycled materials forms a discontinuous phase suspended or dispersed throughout the polymer phase. The manufacture of the dispersed fiber phase within a continuous polymer phase requires substantial mechanical input. Such input can be achieved using a variety of mixing means including preferably extruder mechanisms wherein the materials are mixed under conditions of high shear until the appropriate degree of wetting and intimate contact is achieved. After the materials are fully mixed, the moisture content can be controlled at a moisture removal station. The heated composite is exposed to atmospheric pressure or reduced pressure at elevated temperature for a sufficient period of time to remove moisture resulting in a final moisture content of about 8 wt-% or less. Lastly, the polymer fiber is aligned and extruded into a useful form.

The preferred equipment for mixing and extruding the composition and wood pellet of the invention is an industrial extruder device. Such extruders can be obtained from a variety of manufacturers including Cincinnati Millicron, etc.

The materials feed to the extruder can comprise from about 30 to 50 wt-% of sawdust including recycled impurity along with from about 50 to 70 wt-% of polyvinyl chloride polymer compositions. Preferably, about 35 to 45 wt-% wood fiber or sawdust is combined with 65 to 55 wt-% polyvinyl chloride homopolymer. The polyvinyl chloride feed is commonly in a small particulate size which can take the form of flake, pellet, powder, etc. Any polymer form can be used such that the polymer can be dry mixed with the sawdust to result in a substantially uniform pre-mix. The wood fiber or sawdust input can be derived from a number of plant locations including the sawdust resulting from rip or cross grain sawing, milling of wood products or the intentional commuting or fiber manufacture from waste wood scrap. Such materials can be used directly from the operations resulting in the wood fiber by-product or the by-products can be blended to form a blended product. Further, any wood fiber material alone, or in combination with other wood fiber materials, can be blended with waste stream by-product from the manufacturer of wood windows as discussed above. The wood fiber or sawdust can be combined with other fibers and recycled in commonly available particulate handling equipment.

Polymer and wood fiber are then dry blended in appropriate proportions prior to introduction into blending equipment. Such blending steps can occur in separate powder handling equipment or the polymer fiber streams can be simultaneously introduced into the mixing station at appropriate feed ratios to ensure appropriate product composition.

In a preferred mode, the wood fiber is placed in a hopper, controlled by weight or by volume, to meter the sawdust at a desired volume while the polymer is introduced into a similar hopper have a volumetric metering input system. The volumes are adjusted to ensure that the composite material contains appropriate proportions on a weight basis of polymer and wood fiber. The fibers are introduced into a twin screw extrusion device. The extrusion device has a mixing section, a transport section and melt section. Each section has a desired heat profile resulting in a useful product. The materials are introduced into the extruder at a rate of about 600 to about 1000 pounds of material per hour and are initially heated to a temperature of about 215–225° C. In the intake section, the stage is maintained at about 215° C. to 225° C. In the mixing section, the temperature of the twin screw mixing stage is staged beginning at a temperature of about 205–215° C. leading to a final temperature in the melt section of about 195–205° C. at spaced stages. Once the material leaves the blending stage, it is introduced into a three stage extruder with a temperature in the initial section of 185–195° C. wherein the mixed thermoplastic stream is divided into a number of cylindrical streams through a head section and extruded in a final zone of 195–200° C. Such head sections can contain a circular distribution (6–8" diameter) of 10 to 500 or more, preferably 20 to 250 orifices having a cross-sectional shape leading to the production of a regular cylindrical pellet. As the material is extruded from the head it is cut with a double-ended knife blade at a rotational speed of about 100 to 400 rpm resulting in the desired pellet length.

The following examples were performed to further illustrate the invention that is explained in detail above. The following information illustrates the typical production conditions and compositions and the tensile modulus of a structural member made from the pellet. The following examples and data contain a best mode.

EXAMPLE 1

A Cincinnati millicron extruder with an HP barrel, Cincinnati pelletizer screws, an AEG K-20 pelletizing head with 260 holes, each hole having a diameter of about 0.0200 inches was used to make the pellet. The input to the pelletizer comprised approximately 60 wt-% polymer and 40 wt-% sawdust. The polymer material comprises a thermoplastic mixture of approximately 100 parts of polyvinyl chloride homopolymer (in. weight of 88,000±2000), about 15 parts titanium dioxide, about 2 parts ethylene bis-stearamide wax lubricant, about 1.5 parts calcium stearate, about 7.5 parts Rohm & Haas 820-T acrylic resin impact modifier/process aid and about 2 parts of dimethyl tin thioglycolate. The sawdust comprises a wood fiber particle containing about 5 wt-% recycled polyvinyl chloride having a composition substantially identical to that recited above.

The initial melt temperature in the extruder was maintained between 350° C. and 400° C. The pelletizer was operated at a polar vinyl chloride-sawdust composite combined through put of 800 pounds per hour. In the initial extruder feed zone, the barrel temperature was maintained between 215–225° C. In the intake zone, the barrel was maintained at 215–225° C., in the compression zone the temperature was maintained at between 205–215° C. and in the melt zone the temperature was maintained at 195–205° C. The die was divided into three zones, the first zone at 185–195° C., the second die zone at 185–195° C. and in the final die zone at 195–205° C. The pelletizing head was operated at a setting providing 100 to 300 rpm resulting in a pellet with a diameter of 5 mm and a length as shown in the following Table.

than about 800,000, preferably between 800,000 and 2.0× $10^6$. Further, the coefficient of thermal expansion of the material is well matched to a compromising between aluminum, PVC and wood products and ranges from about 1.6 to $1.8 \times 10^{-5}$ inches per inch-fahrenheit degree. We believe that the superior properties of the structural members made from the composite or pellet of the invention are in large part due to the nature of the pellet set forth in the Table above. We believe the Table clearly shows that the polyvinyl chloride and wood fiber can be combined at various proportions under a variety of temperature conditions to produce a regular pellet. The pellet then can be used in further extrusion processes to form a useful extruded structural member useful in the manufacture of environmentally sensitive windows and doors. The composite is a superior replacement for wood because it has similar mechanical properties but attains a dimensional stability and resistance to rot, and insect damage not attainable by wood products.

TABLE I

PELLETIZER RESULTS

| PVC/Wood Fiber | Pelletizer Melt (Temp., ° F.) | Pellet Length (in.) | Profile Melt (Temp. ° F.) | Profile Visc. | Sawdust Moisture (%) | Pellet Moisture (%) | Pellet Bulk Density (g/cc) | Profile Density (g/cc) | Tensile Modulus (psi) |
|---|---|---|---|---|---|---|---|---|---|
| 60/40 | | 0.233 | 366 | 2580 | 4.71, 4.83 | 0.96 | 0.546 (.006) | 1.426 | 990600 |
| | | | 365 | 2755 | | | | | |
| 60/40 | | 0.233 | 362 | 2452 | 4.71, 4.83 | 0.96 | 0.546 (.006) | | |
| 70/30 | 375 | 0.080 | 375 | 2274 | 5.28 | 1.54 | 0.454 (.007) | 1.43 | 733300 |
| 70/30 | 375 | 0.080 | 376 | 2299 | 5.28 | 1.54 | 0.454 (.007) | 1.435 | 820100 |
| 50/50 | 372 | 0.084 | 382 | 2327 | 4.94 | 1.95 | 0.347 (.002) | 1.367 | 697600 |
| 70/30 | 374 | 0.195 | 385 | 2431 | | 0.93 | 0.595 (.005) | 1.427 | 752900 |
| 70/30 | 374 | 0.195 | 378 | 2559 | | 0.93 | 0.595 (.005) | 1.433 | 787600 |
| 60/40 | 375 | 0.089 | 377 | 1985 | 5.36 | 1.33 | 0.418 (.003) | 1.423 | 1103000 |
| 60/40 | 375 | 0.089 | 374 | 2699 | 5.36 | 1.33 | 0.418 (.003) | 1.408 | 815800 |
| 50/50 | 374 | 0.201 | 367 | 2541 | 5.33 | 2.09 | 0.462 (.004) | | |
| 50/50 | 364 | 0.201 | 366 | 2670 | 5.33 | 2.09 | 0.462 (.004) | 1.397 | 724300 |
| 60/40 | 351 | 0.247 | 374 | 1948 | 4.62 | 1.03 | 0.466 (.009) | 1.426 | 860000 |
| 60/40 | 351 | 0.247 | 370 | 2326 | 4.62 | 1.03 | 0.466 (.009) | 1.433 | 996700 |
| 60/40 | 361 | 0.103 | 373 | 1605 | 5.53 | 1.57 | 0.387 (.005) | 1.431 | 985400 |
| 60/40 | 361 | 0.103 | 381 | 2221 | 5.53 | 1.57 | 0.387 (.005) | 1.435 | 855800 |
| 70/30 | 364 | 0.202 | 376 | 1837 | 5.25 | 1.50 | 0.429 (.010) | 1.433 | 868300 |
| 70/30 | 364 | 0.202 | 378 | 2376 | 5.25 | 1.50 | 0.429 (.010) | 1.434 | 798100 |
| 70/30 | 367 | 0.085 | 374 | 1593 | | 1.48 | 0.378 (.002) | 1.438 | 744200 |
| 70/30 | 367 | 0.085 | 375 | 2145 | | 1.48 | 0.378 (.002) | 1.439 | 765000 |
| 50/50 | 367 | 0.177 | 371 | 2393 | 5.08, 5.51 | 1.61 | 0.434 (.007) | 1.408 | 889200 |
| 50/50 | 367 | 0.177 | 371 | 3008 | 5.08, 5.51 | 1.61 | 0.434 (.007) | 1.528 | 1029000 |
| 50/50 | 366 | 0.085 | 370 | 2666 | | 2.01 | 0.438 (.003) | 1.405 | 922100 |
| 50/50 | 366 | 0.085 | 369 | 2257 | | 2.01 | 0.438 (.003) | 1.383 | 922600 |

In Table I, the composite material is made from a polyvinyl chloride known as GEON 427 obtained from B. F. Goodrich Company. The wood fiber is sawdust by-product of milling soft woods in the manufacture of wood windows at Andersen Corporation, Bayport, Minn. The modulus for neat polyvinyl chloride measured similarly to the composite materials is about 430,000. The Youngs modulus is measured using an Instron Model 450S (Series 9 software) automated materials testing system and uses an ASTM method D-638. Specimens are milled to specifications of the test and are measured at 50% relative humidity, 73° F. with a cross set speed of 0.200 in./min.

Table II contains tensile modulus results from composite materials made using injection molding technology. The Table shows a substantial increase in tensile modulus when compared to non-composite PVC.

We have found that the preferred pellet of the invention displays, in a formed structural member, a Youngs modulus of at least 500,000 and commonly falls in the range greater

TABLE II

Injection Molded Samples

| Description | Tensile Modulus psi | Standard Deviation psi |
|---|---|---|
| High Melt/Large Pellet/40% | 1,205,000 | 242,400 |
| PVC | 488,800 | 28,370 |
| High Melt/Small Pellet/40% | 1,232,000 | 133,300 |

We claim:

1. A composite pellet, capable of formation into a structural member, which pellet comprises a cylindrical extrudate having a radius of about 1 to 5 mm, a length of about 1 to 10 mm;

the pellet composition comprising:

(a) about 45 to 70 wt-% of a polymer comprising vinyl chloride;

(b) about 30 to 50 wt-% of wood fiber having a minimum thickness of 1 μm and a minimum length of 3 μm and a minimum aspect ratio of about 1.8; and (c) less than about 8 wt-% water; and wherein the wood fiber is dispersed throughout a continuous polymer phase.

2. A composite thermoplastic pellet, capable of formation into a structural profile or member, the pellet comprising a thermoplastic cylindrical extrudate having a width of about 1 to 5 mm, a length of about 1 to 10 mm, the thermoplastic pellet composite comprising:

(a) an effective amount, sufficient to form a continuous phase in the composite, of a thermoplastic polymer composition; and (b) an effective amount of wood fiber having a minimum aspect ratio of about 1.8 to provide structural properties to the thermoplastic composite;

wherein the polymer wood fiber are mixed at elevated temperature and pressure such that the fiber comprises less than about 8 wt-% water, the pellet comprises an intimate admixture of wood fiber is dispersed throughout the continuous thermoplastic polymer phase, the pellet is a recyclable thermoplastic and the composite has a Young's modulus of at least about 800,000 psi.

3. The composition of claim 2 wherein the composite has a coefficient of thermal expansion of less than $1.8 \cdot 10^{-5}$ in/in-F°.

4. The composition of claim 2 wherein the composite has a Young's modulus of greater than about 1,000,000 psi.

5. The composition of claim 4 wherein the composite has a coefficient of thermal expansion of less than $1.8 \cdot 10^{-5}$ in/in-F°.

6. The composition of claim 2 wherein the polymer occupies greater than 50% of the interior volume of the fiber.

7. The composition of claim 2 wherein the polymer occupies greater than 70% of the interior volume of the fiber.

8. The composition of claim 2 wherein the polymer comprises a polymer comprising ethylene.

9. The composition of claim 2 wherein the polymer comprises a polymer comprising propylene.

10. The composition of claim 2 wherein the polymer comprises a polyvinyl chloride homopolymer.

11. The composition of claim 2 wherein the polymer comprises a polyvinyl chloride polymer alloy.

12. The composition of claim 2 wherein the wood fiber comprises a by-product of milling or sawing wooden members.

13. The composition of claim 12 wherein the wood fiber comprises sawdust.

14. The composition of claim 2 wherein the composition additionally comprises a compatibilizing agent.

15. The composition of claim 2 wherein the polymer has a molecular weight ($M_w$) of about 90,000±50,000.

16. The composition of claim 2 wherein the polymer comprises a copolymer having molecular weight ($M_w$) of about 88,000±10,000.

17. The composition of claim 2 wherein the wood fiber has a fiber width of up to about 1.5 mm, a fiber length of up to about 10 mm and a aspect ratio of about 2 to 7.

18. The composition of claim 2 wherein the water comprises about 0.01 to 5 wt-% of the pellet.

19. The composition of claim 2 wherein the wood fiber has an aspect ratio of about 6.

20. A thermoplastic polymer and wood fiber composite composition capable of formation into a structural profile or member, the thermoplastic composite composition comprising:

(a) an effective amount, sufficient to form a continuous phase in the composite, of a thermoplastic polymer composition; and (b) an effective amount of wood fiber having a minimum aspect ratio of about 1.8 to provide structural properties to the composite;

wherein the polymer and wood fiber are mixed at elevated temperature and pressure such that the fiber comprises less than about 8 wt-% water, the pellet comprises an intimate admixture of wood fiber dispersed throughout the continuous thermoplastic polymer phase such that the polymer wets and penetrates into wood fiber cells, the pellet is a recyclable thermoplastic and the composite has a Young's modulus of at least about 800,000 psi.

21. The composition of claim 20 wherein the composite has a coefficient of thermal expansion of less than $1.8 \cdot 10^{-5}$ in/in-F°.

22. The composition of claim 20 wherein the composite has a Young's modulus of greater than about 1,000,000 psi.

23. The composition of claim 22 wherein the composite has a coefficient of thermal expansion of less than $1.8 \cdot 10^{-5}$ in/in-F°.

24. The composition of claim 20 wherein the polymer occupies greater than 50% of the interior volume of the fiber.

25. The composition of claim 20 wherein the polymer occupies greater than 70% of the interior volume of the fiber.

26. The composition of claim 20 wherein the polymer comprises a polymer comprising ethylene.

27. The composition of claim 26 wherein the polymer comprises a copolymer comprising ethylene.

28. The composition of claim 20 wherein the polymer comprises a polymer comprising propylene.

29. The composition of claim 28 wherein the polymer comprises a copolymer comprising propylene.

30. The composition of claim 20 wherein the polymer comprises a polyvinyl chloride homopolymer.

31. The composition of claim 20 wherein the polymer comprises a polyvinyl chloride polymer alloy.

32. The composition of claim 20 wherein the wood fiber comprises a by-product of milling or sawing wooden members.

33. The composition of claim 32 wherein the wood fiber comprises sawdust.

34. The composition of claim 20 wherein the composition additionally comprises a compatibilizing agent.

35. The composition of claim 20 wherein the polymer has a molecular weight ($M_w$) of about 95,000±50,000.

36. The composition of claim 20 wherein the polymer comprises a copolymer has a molecular weight ($M_w$) of about 88,000±10,000.

37. The composition of claim 20 wherein the wood fiber has a fiber width of up to about 1.5 mm, a fiber length of up to about 10 mm and a aspect ratio of about 2 to 7.

38. The composition of claim 20 wherein the water comprises about 0.01 to 5 wt-% of the pellet.

39. The composition of claim 20 wherein the wood fiber has an aspect ratio of about 6.

* * * * *

UNITED STATES PATENT AND TRADEMARK OFFICE
CERTIFICATE OF CORRECTION

PATENT NO. : 6,004,668

DATED : DECEMBER 21, 1999

INVENTOR(S) : DEANER ET AL.

It is certified that error appears in the above-identified patent and that said Letters Patent is hereby corrected as shown below:

Title page, under References Cited, U.S. Patent Documents, please insert —5,827,607 10/1998 Deaner et al.—.

Title page, under References Cited, U.S. Patent Documents, "2,926,729" should read —2,296,729—.

Column 4, line 50, "of–at" should read —of at—.

Column 10, please delete claim 1.

Column 11, line 19, "fiber" should read —composite—.

Column 11, line 20, "pellet" should read —composite—.

Column 11, line 21, delete "is"

Column 11, line 22, after "phase" delete "," and insert —such that the polymer wets and penetrates the wood fiber cells,—.

Column 12, line 12, "fiber" should read —composition—.

UNITED STATES PATENT AND TRADEMARK OFFICE
CERTIFICATE OF CORRECTION

PATENT NO. : 6,004,668

DATED : DECEMBER 21, 1999

INVENTOR(S) : DEANER ET AL.

It is certified that error appears in the above-identified patent and that said Letters Patent is hereby corrected as shown below:

Column 12, line 13, "pellet" should read --composition--.

Signed and Sealed this

Nineteenth Day of December, 2000

Attest:

Q. TODD DICKINSON

*Attesting Officer*    *Commissioner of Patents and Trademarks*

UNITED STATES PATENT AND TRADEMARK OFFICE
CERTIFICATE OF CORRECTION

PATENT NO.     : 6,004,668
DATED          : December 21, 1999
INVENTOR(S)    : Deaner et al.

Page 1 of 1

It is certified that error appears in the above-identified patent and that said Letters Patent is hereby corrected as shown below:

Column 1,
Line 13, "an" should read -- can --

Column 3,
Line 39, "an" should read -- can --

Column 5,
Line 6, "as" should read -- is --

Column 11,
Line 18, add -- and -- between "polymer" and "wood"

Column 12, claim 20,
Line 16, "pellet" should read -- composite --

Signed and Sealed this

Thirtieth Day of October, 2001

Attest:

NICHOLAS P. GODICI
Attesting Officer
Acting Director of the United States Patent and Trademark Office